Figure 1:
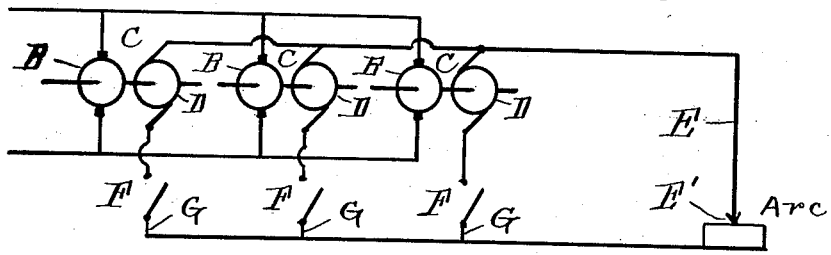

Nov. 30, 1926.
J. E. GRANGER
1,608,594
METHOD OF OPERATING ELECTRIC WELDING APPARATUS
Filed August 12, 1922

Inventor:
Joseph E. Granger,
by Bradbury & Caswell
Attorneys.

Patented Nov. 30, 1926.

1,608,594

UNITED STATES PATENT OFFICE.

JOSEPH E. GRANGER, OF ALHAMBRA, CALIFORNIA.

METHOD OF OPERATING ELECTRIC WELDING APPARATUS.

Application filed August 12, 1922. Serial No. 581,381.

This invention relates to the method of operating electric welding apparatus. This art has been developed so that it is now practical in nearly all operations where iron or steel are to be joined, built, or cut up by utilizing the heat of an electric arc formed between the electrode and the object to be welded. This object is usually connected to one terminal of the electric circuit and an electrode is connected to the opposite terminal. When the electrode is touched to the work and withdrawn the proper distance an arc is formed which the operator maintains by manipulation of the electrode holder. The arc melts a small pool of metal on the work and in welding or building up, the additional metal is deposited in this pool in a molten state. The heat is thus confined to the immediate locality of the weld and builds up very rapidly and in a highly efficient manner. For joining two pieces of metal uniformly and with great strength a metallic electrode is usually employed and for cutting purposes, plugging up holes in castings and joining parts where strength and appearance are not so essential, or where the surface is to be machined off, a carbon electrode is employed. In the carbon electrode method metal is built upon from a rod of filling material in a manner similar to soldering with an iron, or welding with a gas torch.

In the present process it is desirable that a comparatively low voltage and low energy input within certain limits be employed and it is usually desirable to have the curve of the voltage characteristic droop as the arc is started. The voltage should be higher before the arc is started than it is after the arc is established. Various attempts have been made to accomplish these results effectively but such attempts have resulted in the employment of complicated apparatus employing resistances, switches, balancing means and contacts which are subject to disorder and which only arrive at a rough approximation of the results desired and which eventually either break down or produce at times poor welding even in the hands of experts. By careful experiment and practical application in the art of electric welding, I have developed an extremely simple and effective means for accomplishing the desired results and overcoming former objections.

The main object of this invention is the provision of and method of operating an electric welding apparatus in which any desired current output and voltage characteristic may be obtained.

A further object of this invention is to provide an electric welding apparatus embodying a plurality of current furnishing elements arranged in multiple and so that said elements may be cut in or out of the circuit whereby the elements used may be worked at the proper capacity for any class of work.

Figure 2:
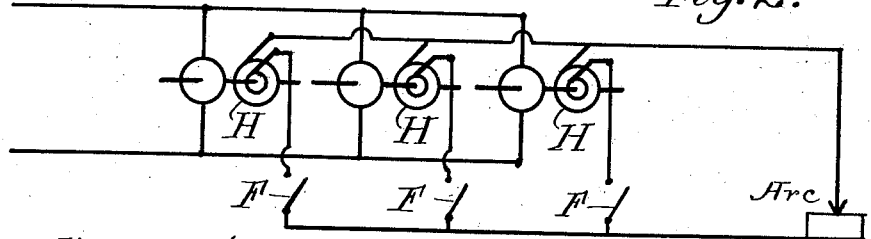
Figure 3:
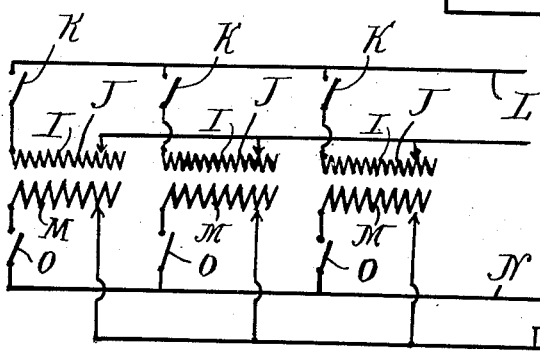
Figure 4:
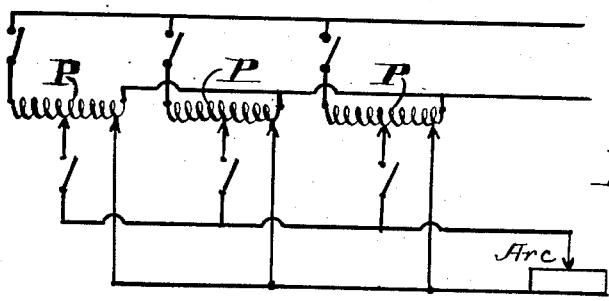

In the accompanying drawing forming part of this specification, Figure 1 is a diagram illustrating one form of apparatus for carrying my invention into use, and Figs. 2, 3 and 4 are diagrammatic views of other forms of my invention which employ the basic idea involved in the construction shown in Fig. 1.

Referring more particularly to Fig. 1, A indicates a line circuit from which current of direct or alternating type and of any desired voltage may be derived for operating the motor drive elements, of a group of multiple connected dynamotors C. Each dynamotor has a driven electric current generator D, of low voltage which is adapted to furnish part of welding current for one operator. These electric current generators are connected in multiple with the welding circuit E, containing the weld or welding tool E', a switch F, being employed in a branch G, by which current from one, two or any number of generators may be thrown into or cut out of connection with the welding circuit for increasing or diminishing the amount of direct current employed for welding, thus varying the slope of the drooping voltage characteristic. In this manner any desired amount of current is immediately available, thus enabling the operator to produce an effective weld.

In all of the methods for applying my invention the slope of the drooping voltage characteristic is obtained by working the current furnishing elements used at sufficient high current output. By increasing the number or capacity,—by capacity I mean relative current output of an element after the arc is established—, of elements used in multiple the current furnished by each element will be less when the arc is started, and the slope of the voltage curve will be comparatively less. By decreasing the number or capacity of the elements used in multiple the current furnished by each element will be more when the arc is started, and the slope of the voltage curve will be comparatively more. By using current output elements of varying capacities,—by varying capacity I mean that certain of the group of current furnishing elements can be designed to furnish more current than the others after the arc is established—, a regulation of the drooping voltage may be effected by cutting out of circuit one or more elements and cutting into circuit an equal number having more capacity or having less capacity. The suitable drooping voltage curve for any class of work may be obtained either by regulating the number of elements used or by changing the combination of capacities used, or by both changing the number of elements used and by changing the combination of elements used.

While I have illustrated a plurality of dynamotors for accomplishing the results attained, the use of electric motors may be dispensed with leaving merely the plurality of multiple connected direct current dynamos. These dynamos may be driven by any power element or elements desired, it being obvious that gas, steam, or any other prime mover may be substituted effectively within the spirit of my invention.

In Fig. 2, I have illustrated the use of alternating current dynamos H, in place of the direct current dynamos shown in Fig. 1, for supplying low voltage alternating current to the weld. The switches F, in this construction also serve to regulate the use of one or any number of supply units. These alternating current dynamos may be driven by any power element or elements desired.

In Fig. 3, I have illustrated the use of static transformers I, having their input coils J, connected in multiple and controlled by switches K, with the current supply line L. The output coils M are also connected in multiple with the welding circuit N, in which the welding arc is produced, each output coil being controlled by a switch O, whereby current of the proper voltage characteristic may be supplied for the weld.

In Fig. 4, the invention is shown applied in use when auto-transformers P are employed in place of the static-transformers shown in Fig. 3. In all of these applications of my invention a plurality of small current out-put elements are employed to furnish welding current for one operator, said elements being of any form desired but being controlled so that one, two or any number or combination of capacities may be connected in multiple to attain the required arc characteristics. In welding practice, in all of the applications of my invention, the welding current characteristic is attained by regulating the number or combination of small current furnishing elements used.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to secure by Letters Patent is:

1. The method of operating electric welding apparatus which consists in providing a number of low potential current output elements in multiple in a welding current circuit and in cutting out such number of said elements as will cause the remainder to be worked at such a high current output as will cause them to have any desired drooping voltage characteristic.

2. The method of operating electric welding apparatus which consists in providing a number of low potential current output elements in multiple in a welding current circuit, and in introducing in said circuit such number of said elements as will cause the elements used to be worked at such a high current output as will cause them to deliver current at the welding terminals of the desired drooping voltage characteristic for the class of work to be done.

In witness whereof I have signed my name to this specification.

JOSEPH E. GRANGER.